United States Patent
Park et al.

(10) Patent No.: US 8,516,504 B1
(45) Date of Patent: Aug. 20, 2013

(54) METHOD FOR ADDING DEVICE INFORMATION BY EXTENDING AN APPLICATION PROGRAMMING INTERFACE

(75) Inventors: Jim Park, San Jose, CA (US); David Karchmer, Los Altos, CA (US)

(73) Assignee: Altera Corporation, San Jose, CA (US)

( * ) Notice: Subject to any disclaimer, the term of this patent is extended or adjusted under 35 U.S.C. 154(b) by 753 days.

(21) Appl. No.: 10/353,452

(22) Filed: Jan. 28, 2003

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/328; 717/140

(58) Field of Classification Search
USPC ......................................... 719/328; 717/140
See application file for complete search history.

(56) References Cited

U.S. PATENT DOCUMENTS

| | | | | |
|---|---|---|---|---|
| 5,848,273 A | * | 12/1998 | Fontana et al. | 717/108 |
| 5,960,214 A | * | 9/1999 | Sharpe et al. | 710/15 |
| 6,173,245 B1 | * | 1/2001 | Karchmer et al. | 703/22 |
| 6,243,853 B1 | * | 6/2001 | Parker | 716/18 |
| 6,529,913 B1 | * | 3/2003 | Doig et al. | 707/101 |
| 7,096,453 B2 | * | 8/2006 | Dionne et al. | 717/105 |
| 7,152,072 B2 | * | 12/2006 | Dobrowski et al. | 707/102 |
| 2002/0040410 A1 | * | 4/2002 | Leach et al. | 719/315 |
| 2002/0095501 A1 | * | 7/2002 | Chiloyan et al. | 709/227 |

* cited by examiner

*Primary Examiner* — H S Sough
*Assistant Examiner* — Kimberly Jordan
(74) *Attorney, Agent, or Firm* — Ropes & Gray LLP

(57) ABSTRACT

A method or apparatus that allows new devices to be easily integrated with computer aided design (CAD) tools via an easily extensible application programming interface (API). In an embodiment, new devices are added by reading a new device type and assigning a sequential index value. Index values are assigned to the new devices by appending a new device type to the end of an enumeration construct. When the data structure is compiled, the new device type is converted to a sequential index value. Data values for the new device are added to a data structure and can be accessed via the index value. Because the added device type is appended to the end of the enumeration construct, the index values assigned to the original data types remain unchanged. Consequently, recompilation is only required for applications that need to access the new devices and is unnecessary for the applications that do not use the new devices.

15 Claims, 4 Drawing Sheets

METHOD FOR ADDING DEVICE INFORMATION BY EXTENDING AN APPLICATION PROGRAMMING INTERFACE

FIELD OF THE INVENTION

The invention relates in general to software interfaces, and in particular to extending application programming interfaces to include new devices.

BACKGROUND OF THE INVENTION

Many software and hardware applications use application programming interfaces (APIs) to access other hardware or software applications. APIs can be used to retrieve data or to invoke a specific function from another application. For example, software tools, which are used to develop hardware or software applications, can use an API to access a database of devices or functions available for developing specific applications.

FIG. 1 illustrates a computer aided design (CAD) tool 100. CAD tool 100 includes design modules 105, 110, 115, and 120, which perform different design-related tasks. In an embodiment, CAD tool 100 is used to develop user-defined applications for programmable logic devices. In this embodiment, example design modules include a placer 105, router 110, timing analyzer 115, and assembler 120. In other embodiments, the number and function of the design modules will vary.

The design modules communicate with a device database 125 to retrieve device information for the numerous devices available to a designer. Device information includes operating parameters, which define a device, and an API, which enables access to a device's operating parameters and functions. The device information, including the operating parameters and API associated with each device, are stored in data classes in the device database 125.

When a new device becomes available, the operating parameters and API associated with the new device must be integrated with the CAD tool 100 before designers can use the device in their designs. Device data files 130 define device operating parameters and API. A parser 135 processes the device data files and inserts the device operating parameters and API into an appropriate data class stored in the device database 125. Header files 140 contain programming declarations for a device's operating parameters and API. Both the design modules and user applications use the programming declarations in the header files 140 to identify and access devices. A location class 145 stores location information for devices. As discussed below, the device data files 130, the header files 140, and the location class 145 must be modified to integrate new devices with the CAD tool 100.

FIG. 2 illustrates a method 200 for integrating new devices with the CAD tool 100. A device database engineer, who is responsible for maintaining the device database and the header files, typically performs the integration process. At step 210, a device database engineer creates or modifies device data files to define the operating parameters and API for the new device. At step 220, the device database engineer adds programming declarations to the header files. The programming declarations correspond to the operating parameters and API defined in the device data files. If the device data file includes new data types, then at step 230 the device database engineer needs to modify the parser 135 to handle the new data types. Additionally, the data classes in the device database 125 need to be modified to include new data or devices at step 240. A new location class is then created for a new device at step 250. Finally, at step 260, any design module or application depending on any modified class is recompiled with the modified header files.

The method 200 for integrating new devices into the CAD tool 100 is fraught with complications. Not only do the numerous steps of the method require substantial engineering effort for each device added, each step introduces the possibility of human error. Moreover, device operating parameters and APIs are constantly being added or modified, making device integration a continuous chore.

Recompilation of design modules and user applications is another substantial flaw with this method. Recompilation of complicated design modules and user applications can take many hours to process. Further, the integration of new devices breaks older versions of the design modules and user applications until they are recompiled, even when the design modules and user applications do not use the new devices.

Thus, it is desirable to: 1) minimize the engineering effort needed to integrate new devices with CAD tools; 2) reduce the possibility of human error when adding new devices; and 3) eliminate the need to recompile design modules and user applications when new devices are added.

BRIEF SUMMARY OF THE INVENTION

The invention, generally, is a method or apparatus that allows new devices to be easily integrated with CAD tools via an easily extensible API. In an embodiment, new devices are added by reading a new device type from a file. Each new device type is assigned a sequential index value. Data values associated with the new device are read and added to a data structure used by the CAD tool.

In an embodiment, index values are assigned to the new devices by appending a new device type to the end of an enumeration construct. When the data structure is compiled, the new device type is converted to a sequential index value. Because the added device type is appended to the end of the enumeration construct, the values assigned to the original data types remain unchanged. Applications that depend on previous versions of the original data structure will operate correctly with the modified data structure. This makes recompilation unnecessary for the applications that do not use the new devices. Recompilation is only required for applications that need to access the new devices.

In a further embodiment, a header file is created to declare the data structure with the new device type. Applications using a new device are compiled with the header file. When the applications are compiled, at least one reference to the new device type is converted to a reference to the sequential index value.

In another embodiment, the data structure includes a data vector having a plurality of data elements. The data elements include a data attribute, or alternately a reference to a function. In an alternate embodiment, the data structure includes a conditional branch statement for selecting one of a plurality of actions. An action selected by the conditional branch statement includes returning a data attribute or calling a function.

BRIEF DESCRIPTION OF THE DRAWINGS

The invention will be described with reference to the drawings, in which.

DETAILED DESCRIPTION OF THE INVENTION

Figure 1:
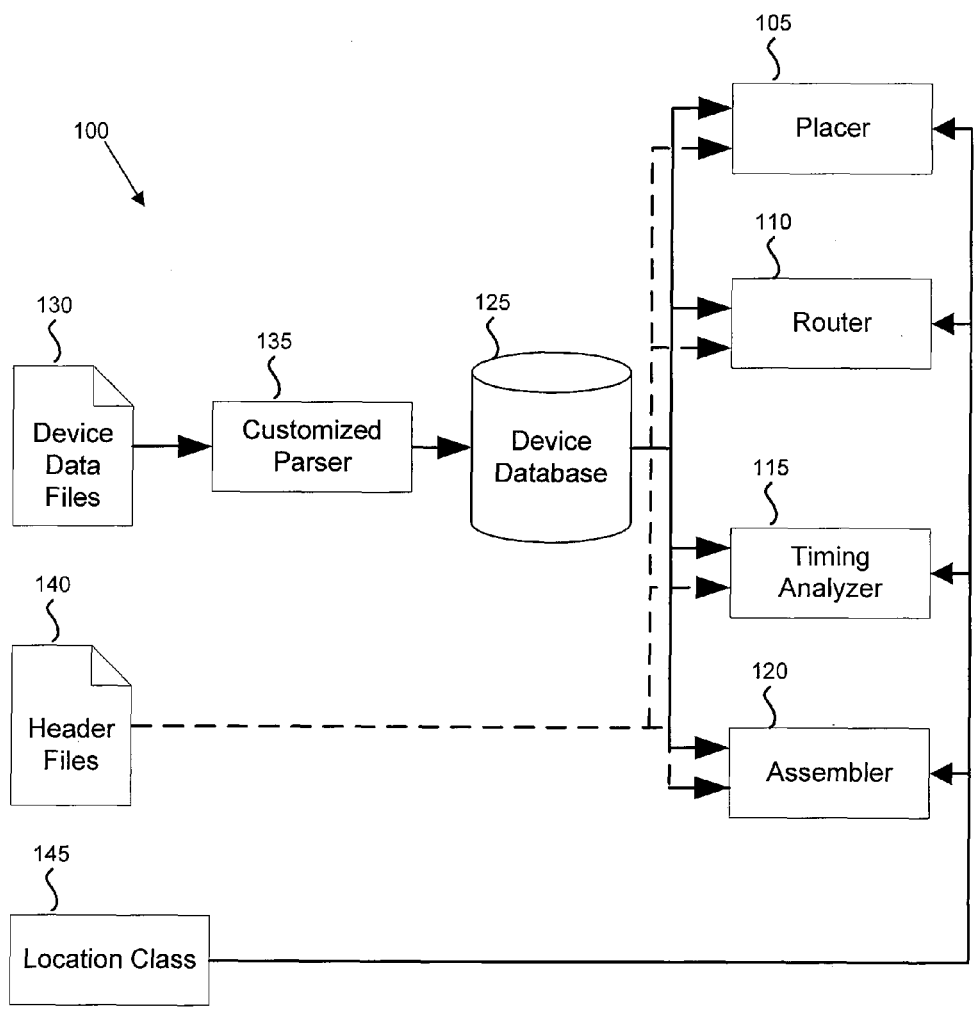
FIG. 1 illustrates a computer aided design (CAD) tool.
Figure 2:
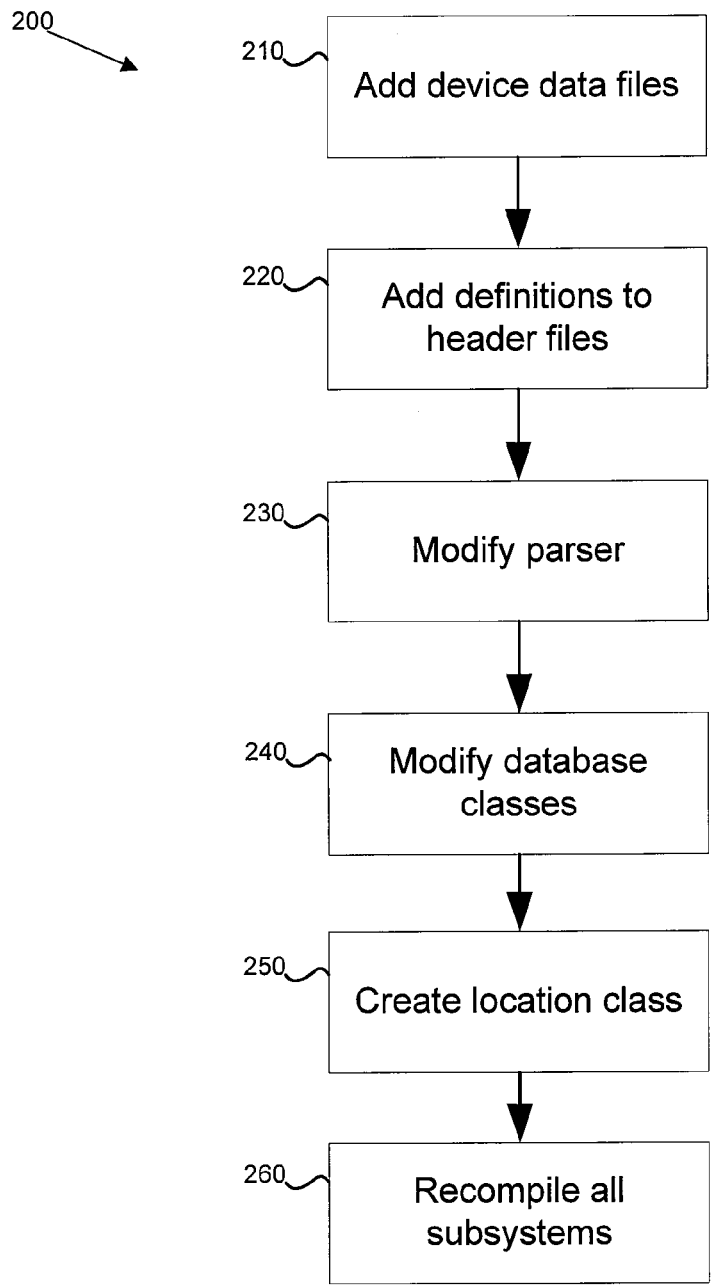
FIG. 2 illustrates a method for integrating new devices with the CAD tool.

API functions and device operating parameters are typically arranged into data classes. Data classes are widely used in many different object-oriented programming languages. Traditionally, new functions are added to the class interface to add new functionality, for example API functions or device operating parameters. A new function declaration is also added to a header file to enable access to the new functionality by other data classes or applications. The modified data class, along with any dependent data classes or device operating parameters, are then recompiled.

To avoid the difficulties inherent in constantly modifying data classes, as discussed above, one embodiment of the present invention combines several functions and their associated declarations into a single general function which is easily extensible. Table 1 illustrates a group of function declarations written in the C++ programming language for several functions in an example API.

TABLE 1

```
int get_apple_id(apple_class* apple);
int get_orange_id(orange_class* orange);
int get_banana_id(banana_class* banana);
float get_apple_count( );
float get_orange_count( );
float get_banana _count( );
```

In an embodiment, the function declarations can be grouped together according to their type of return value (for example float or integer), the number and type of parameters, or by both characteristics. Table 2 shows the grouping of three of the functions of Table 1 with both the same parameter type (void) and the same return value type (float).

TABLE 2

```
float get_apple_count( );
float get_orange_count( );
float get_banana_count( );
```

All three of the functions in Table 2 can be described generally as "fruit counting functions." A generic function containing these three functions is declared in Table 3.

TABLE 3

```
float get_fruit_count(FRUIT_TYPE fruit);
```

The generic function "get_fruit_count" has the member functions "get_apple_count", "get_orange_count", and "get_banana_count". The addition of the function parameter "fruit" selects between these member functions.

An enumeration construct can be used to select the functions. Enumeration constructs are natively supported in many different programming languages, or can be added. An enumeration construct assigns sequential values to each of the elements of a construct. Table 4 illustrates an enumeration construct to be used with the generic function of Table 3.

TABLE 4

```
enum FRUIT_TYPE
{
```

TABLE 4-continued

```
APPLE,
ORANGE,
BANANA
};
```

In the enumeration construct of Table 4, the compiler will automatically assign "APPLE" a value of "1", "ORANGE" a value of "2", and "BANANA" a value of "3". As will be discussed below, this sequential assignment of values is useful in easily extending data class. The values assigned by the compiler will be used by the generic function to select the appropriate member function.

Table 5 illustrates an example implementation of the "get_fruit_count" function of Table 3.

TABLE 5

```
int get_fruit_count(FRUIT_TYPE fruit)
{
    switch(fruit)
    {
        case APPLE:
            return get_apple_count( );
            break;
        case ORANGE:
            return get_orange_count( );
            break;
        case BANANA:
            return get_banana count( );
            break;
    }
}
```

In this example, a programmer would replace a call to "get_apple_count( )" function with a call to "get_fruit_count (APPLE)". The enumeration construct that defines the value of the "APPLE" parameter is included in a header file so that any reference to this parameter is interpreted correctly by the compiler. During compilation, the compiler replaces the parameter "APPLE" with the appropriate value in both the function call and the function implementation, ensuring that the parameter "APPLE" selects the appropriate function.

Adding functionality to a class is greatly simplified using this arrangement. First, a new function type is appended to the end of the enumeration. Second, the new function and its function type are added to the generic function. Tables 6 and 7 illustrate adding a function to the API according to an embodiment of the invention.

TABLE 6

```
enum FRUIT_TYPE
{
APPLE,
ORANGE,
BANANA,
PEACH
};
```

TABLE 7

```
int get_fruit_count(FRUIT_TYPE fruit)
{
    switch(fruit)
    {
        case APPLE:
            return get_apple_count( );
            break;
        case ORANGE:
```

TABLE 7-continued

```
            return get_orange_count( );
            break;
        case BANANA:
            return get_banana_count( );
            break;
        case PEACH:
            return get_peach_count( );
            break;
    }
}
```

As discussed above, the compiler automatically assigns sequential values to elements of the enumeration construct. For the example of Tables 6 and 7, the type "PEACH" is assigned a value of "4". Because the added data type is appended to the end of the enumeration, the values assigned to the original data types ("APPLE", "ORANGE", and "BANANA") remain unchanged. Applications that depend on the original data types will operate correctly with the modified API function. This makes recompilation unnecessary for the applications that do not use the added API functionality. Recompilation is only required for applications that need to access the added API functionality.

In another embodiment, functions with different parameters or return values can be grouped together. For example, Table 8 illustrates three functions with the same type of return value, but with different parameters.

TABLE 8

```
int get_apple_id(apple_class* apple);
int get_orange_id(orange_class* orange);
int get_banana_id(banana_class* banana);
```

A generic function encompassing these three functions can use a void pointer or other generic data type for its input parameter. Table 9 is one example of a function declaration for this type of generic function. Alternatively, if the data types "apple_class", "orange_class", and "banana_class" are all derived from a single parent data class, then the generic function can use the parent class as a function parameter. Table 10 illustrates an example of a function declaration using a parent data class. Generic types or parent data classes can also be used for groups of functions with different return value data types.

TABLE 9

```
int get_fruit_id(void* fruit);
```

TABLE 10

```
int get_fruit_id(fruit class* fruit);
```

The use of void pointers or other generic data types introduces the possibility of data type mismatch errors. In a further embodiment, the generic function includes type-checking code to ensure the proper data type is used for each function within the broader generic function.

Data classes are frequently modified to include additional member variables. The generic function for these types of modifications can be implemented more efficiently than the example of Table 7. Instead of using a "switch" statement to select different functions or member variables within the generic functions, member variables are stored in a vector or array. The enumeration construct is then used to define the index in the vector for each member variable. Table 11A illustrates an example implementation of a generic function using a switch statement to select and return a member variable.

TABLE 11A

```
enum FRUIT_TYPE
{
APPLE,
ORANGE,
BANANA
MAX
};
int get_fruit_count_switch(FRUIT_TYPE fruit)
{
    int apple_count, orange_count, banana_count;
    switch(fruit)
    {
        case APPLE:
            return apple_count;
            break;
        case ORANGE:
            return orange_count;
            break;
        case BANANA:
            return banana_count;
            break;
    }
}
```

Table 11B illustrates an example implementation of a generic function using a vector, rather than a switch statement, to select and return a member variable. In this example, a class "FRUIT_DATA" has two methods "get_fruit_count" and "set_fruit_count". The first method retrieves data from the class, and the second method stores data in the class. Both methods access elements of a private data vector through an index defined by the

TABLE 11B

```
"FRUIT_TYPE" enumeration.
enum FRUIT_TYPE
{
APPLE,
ORANGE,
BANANA
MAX
};
class FRUIT_ DATA
{
public:
    int get_fruit_count(FRUIT_TYPE fruit);
    void set_fruit_count(FRUIT_TYPE fruit, int count);
private:
    int fruit_count[MAX];
};
int FRUIT_DATA::get_fruit_count(FRUIT_TYPE fruit)
{
    return this->fruit_ count[fruit];
}
void FRUIT_DATA::set_fruit_count(FRUIT_TYPE fruit, int count)
{
    this->fruit_count[fruit] = count;
}
```

In this example implementation, the variables "apple_count", "orange_count", and "banana_count" from the "get_fruit_count_switch" function correspond to the elements of the vector "fruit_count[ ]" in the "get_fruit_count_vector" function. The vector implementation can be extended to select member functions in a similar manner.

As discussed above, additional member variables can be added to a data class by modifying the data class and adding new member variables to the end of the enumeration construct. When the data class is modified in this manner, any applications depending on the unmodified data class will operate correctly with the modified data class without the need for recompilation. Recompilation is only required for applications accessing the added member variables or functions of the data class.

In another embodiment, functions with a varying number of parameters can be grouped together into a single generic function. Many programming languages, such as C++, support variable length argument lists for functions. Table 12 illustrates two different functions declarations that can be combined into a generic function.

TABLE 12

```
int count_apples_in_tree(apple_tree* tree);
int count_apples_in_grove(list_of_groves* groves, int grove_id);
```

As discussed above, an enumeration construct is used to select between the functions. Table 13 illustrates an example enumeration construct for the functions of Table 12.

TABLE 13

```
enum APPLE_COUNTING_MODE
{
FROM_TREE,
FROM_GROVE_IN_LIST_OF_GROVES
};
```

Table 14 illustrates a generic function using the enumeration construct of Table 13 to select one of the functions of Table 12.

TABLE 13

```
int count_apples(APPLE_COUNTING_MODE mode, . . . )
{
  va_list ap;
  va_start(ap, mode);
  switch(mode)
  {
    case FROM_TREE:
    }
      apple_tree* tree = va_arg(ap, apple_tree*);
      //Code to count and parse arguments
      break;
    }
    case FROM_GROVE_IN_LIST_OF_GROVES:
    {
      list_of_groves* groves = va_arg(ap, list_of_groves*);
      int grove_id = va_arg(ap, int);
      //Code to count and parse arguments
      break;
    }
  }
}
```

The use of a generic function to select between several member functions allows any API to be easily modified or extended with new functionality. In one embodiment, this programming model is used by a CAD tool to minimize the engineering effort needed to integrate new devices with CAD tools; reduce the possibility of human error when adding new devices; and eliminate the need to recompile design modules and user applications when new devices are added.

Figure 3:
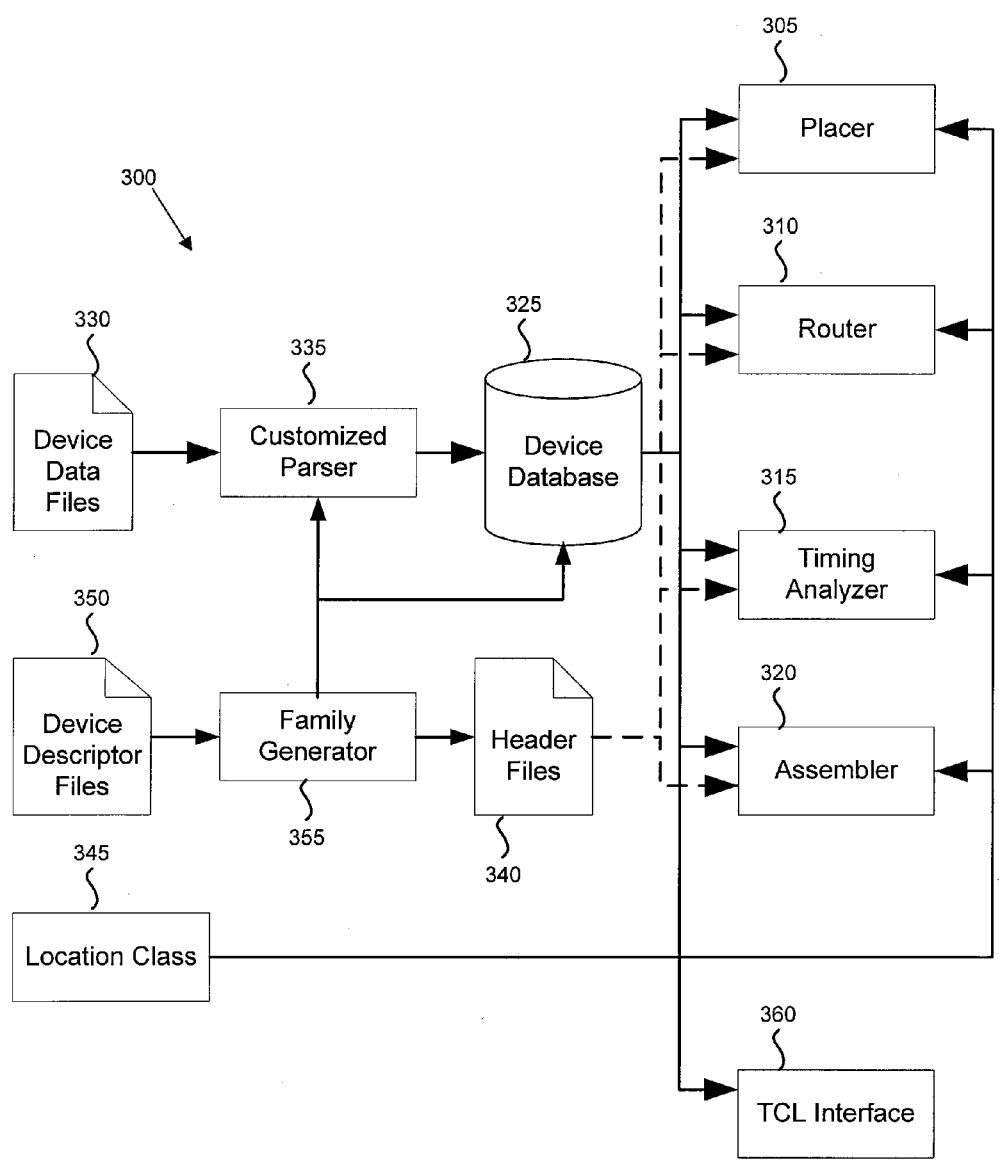
FIG. 3 illustrates an improved CAD tool according to an embodiment of the invention.

FIG. 3 illustrates a computer aided design (CAD) tool 300. CAD tool 300 includes design modules 305, 310, 315, and 320, which perform different design-related tasks. In an embodiment, CAD tool 300 is used to design user applications for programmable logic devices. In this embodiment, example design modules include a placer 305, router 310, timing analyzer 315, and assembler 320. In other embodiments, the number and function of the design modules will vary.

The design modules communicate with a device database 325 to retrieve device information for the numerous devices available to a designer. Device information includes operating parameters, which define a device, and an API, which enables access a device's operating parameters and functions. The device information, including the operating parameters and API associated with each device, are stored in data classes in the device database 325.

When a new device becomes available, the operating parameters and API associated with the new device must be integrated with the CAD tool 300 before designers can use the device in their designs. Device data files 330 define device operating parameters and APL. In an embodiment, each device data file lists data in the form of attribute/value pairs. Table 14 illustrates an example of a portion of a device data file. In some applications, device data files may have hundreds of attribute/value pairs.

TABLE 14

| Device | Foo |
|---|---|
| Number_of_IO | 6 |
| Number_of_PLL | 2 |
| Package_Type | 200 |
| VCC_Power | 1.5 |
| Bar | False |

A parser 335 processes the device data files and inserts the device operating parameters and API into a data class stored in the device database 325. In an embodiment, the parser matches attributes in the device data file with a list of recognized attributes stored in a hash table. The hash table identifies the data class and member variable corresponding with each matching attribute. The corresponding value of the attribute/value pair is then stored in the appropriate member variable.

Header files 340 contain programming declarations for a device's operating parameters and API. Both the design modules and user applications use the programming declarations in the header files 340 to identify and access devices. In an embodiment, an enumeration construct is used to select device attributes or functions, as discussed above. A location class 345 retrieves location information for devices.

In an embodiment, a family generator 355 uses the techniques discussed above to integrate new devices with the CAD tool 300. A device descriptor file 350 lists all of the available devices. Additionally, the device descriptor file lists the attributes for each device and the data type associated with each attribute. Table 15 illustrates a portion of a device descriptor file corresponding to the device data of Table 14.

TABLE 15

| Foo | "Foo" |
|---|---|
| Number_of_IO | Integer |
| Number_of_PLL | Integer |
| Package_Type | Integer |
| VCC_Power | Float |
| Bar | Boolean |

As new devices are added to the device descriptor files 350, the family generator 355 uses the information from the device descriptor files 350 to locate device data files for new devices and integrate the new devices with the CAD tool 300. The family generator 355 reads all of the attributes associated with the new device from the device descriptor files 350. The family generator 355 adds the attribute names to the appropriate enumeration constructs. In an embodiment, each data type is associated with a different enumeration construct. If an attribute introduces a new data type, the family generator modifies the data class to handle the new data type and creates a new enumeration construct.

Figure 4:
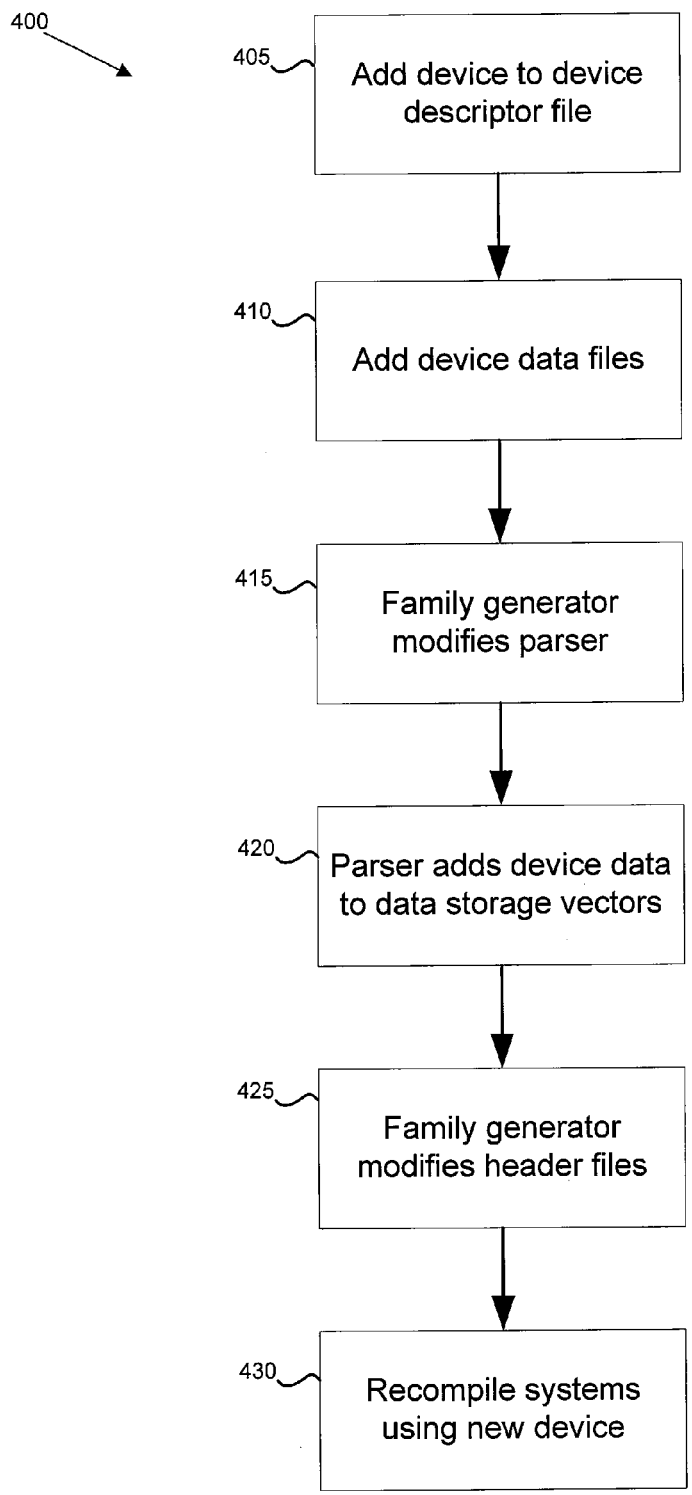
FIG. 4 illustrates a method for integrating new devices with the CAD tool according to an embodiment of the invention.

FIG. 4 illustrates a method 400 for integrating new devices with the CAD tool 300. At step 405, a new device is added to a device descriptor file. In an embodiment, the device descriptor file has a table associating device names with corresponding device data files. A new device is added to the device descriptor file by adding a list entry with the device name and the name of the corresponding device data file.

At step 410, device operating parameters and APIs for the new device are defined in a device data file. As discussed above, in an embodiment, new device data can be listed in the form of attribute/value pairs.

At step 415, the family generator reads the device descriptor file and determines if new devices have been added. For each new device, the family generator reads a corresponding device data file. The family generator compares a list of attribute names stored in the parser hash table with the attributes listed in the device data file for the new device. If the device data file contains new attributes, then the family generator adds the new attribute names to the parser's hash table.

At step 420, the parser processes the device data file to add the new device attribute values to the data classes. In an embodiment where the member variables of a data class are stored as data vectors, the parser appends the new device values to the end of the data vectors. This ensures that the addition of new device data does not change the location of older device data, and allows applications not using the new device data to continue operating without recompilation. In an embodiment where new device functionality is selected with a "switch" statement, the family generator modifies the data classes to include "case" statements for the added functionality.

At step 425, the family generator modifies the header files to include the added device information. As discussed above, an enumeration construct included in the header files is used to select device attributes or functions. One or more new function types are appended to the end of the enumeration constructs in the header files. New device attributes or functions can be selected from the data class using the added function types. As before, the new data types are added to the end of the enumeration construct so that the compiler-assigned values for the older function types are unchanged, which allows applications not using the new device data to continue operating without recompilation.

At step 430, the modified data classes and any applications requiring access to new devices are recompiled. The method 400 for integrating new devices with the CAD tool 300 has numerous advantages. Applications that do not need access to the new devices do not need to be recompiled. Additionally, only two of the steps of the method 400 require user effort. The remaining steps are performed automatically by the parser and the family generator. This automation reduces the engineering effort needed to integrate new devices and significantly decreases the possibility of human error.

Another benefit of this system is the addition of a script interface 360. The script interface 360 allows external applications or users to access the device database 325 directly through a scripting language, such as TCL, Perl, or Python. The script interface 360 can be used to provide engineers and customers with updated device data. Because the addition of new devices does not alter the interface for selecting older devices, the script interface does not have to be modified each time new devices are added.

Those skilled in the art will appreciate that the present invention establishes a method for modifying or extending any type of software interface without the need to recompile other dependent software. The present invention has been described in relation to particular embodiments that are intended in all respects to be illustrative rather than restrictive. Therefore, it should be understood that the method and apparatus of the present invention could be practiced with modification and alteration within the spirit and scope of the claims herein. Furthermore, the invention may be implemented in any combination of hardware and/or software. Alternative embodiments will become apparent to those skilled in the art to which the present invention pertains without departing from its spirit and scope.

What is claimed is:

1. A method of adding device information to a device database, the method comprising:
   receiving a device descriptor file, wherein the device descriptor file comprises a list of device types for a plurality of available devices, each device type being associated with a set of one or more attributes, each attribute being associated with a data type;
   reading the device descriptor file;
   parsing the list of device types from the device descriptor file;
   identifying a new device type in the list of device types, wherein the device type identifies a new type of device to be integrated with a computer-aided design (CAD) tool;
   assigning a sequential index value to the new device type;
   reading a new attribute associated with the new device type;
   adding the new attribute to a pre-existing data structure, wherein the new attribute is accessible in the pre-existing data structure via a reference to the new device type;
   compiling the pre-existing data structure, wherein the reference to the new device type is converted to a reference to the sequential index value; and
   preserving a second reference associated with a second sequential index value and a second device type previously added to the pre-existing data structure, wherein the compiled pre-existing data structure enables a previously compiled application to access the second device type via the second sequential index value without recompiling the application.

2. The method of claim 1, wherein the assigning comprises:
   appending the new device type to the end of the list of device types, wherein each device type on the list is assigned a sequential index value according to its position on the list.

3. The method of claim 1, further comprising:
   creating a header file declaring the pre-existing data structure with the new device type.

4. The method of claim 3, further comprising:
   compiling an application including the header file, wherein at least one reference to the new device type is converted to a reference to the sequential index value.

5. The method of claim 1, wherein the pre-existing data structure includes a vector having a plurality of data elements.

6. The method of claim 5, wherein the plurality of data elements include the set of one or more attributes.

7. The method of claim 5, wherein the plurality of data elements include references to a function.

8. The method of claim 1, wherein the pre-existing data structure includes a conditional branch statement for selecting one of a plurality of actions.

9. The method of claim 8, wherein one of the plurality of actions includes returning one attribute of the set of one or more attributes.

10. The method of claim 9, wherein one of the plurality of actions includes calling a function.

11. The method of claim 1, wherein the compiled pre-existing data structure is adapted to be accessed by first and second applications previously compiled prior to the adding the new attribute to the pre-existing data structure, the method further comprising:
   recompiling the first application to enable the first application to access the new attribute, wherein the compiled pre-existing data structure enables the second application to access a second attribute included in the compiled pre-existing data structure without recompiling the second application.

12. A non-transitory information storage medium having a plurality of instructions adapted to direct an information processing device to perform the steps of:
   receiving a device descriptor file, wherein the device descriptor file comprises a list of device types for a plurality of available devices, each device type being associated with a set of one or more attributes, each attribute being associated with a data type;
   reading the device descriptor file;
   parsing the list of device types from the device descriptor file;
   identifying a new device type in the list of device types, wherein the device type identifies a new type of device to be integrated with a computer-aided design (CAD) tool;
   assigning a sequential index value to the new device type;
   reading a new attribute associated with the new device type;
   adding the new attribute to a pre-existing data structure, wherein the new attribute is accessible in the pre-existing data structure via a reference to the new device type;
   compiling the pre-existing data structure, wherein the reference to the new device type is converted to a reference to the sequential index value, and
   wherein the compiled pre-existing data structure is adapted to be accessed by first and second applications previously compiled prior to the adding the new attribute to the pre-existing data structure, the steps further comprising:
   recompiling the first application to enable the first application to access the new attribute, wherein the compiled pre-existing data structure enables the second application to access a second attribute included in the compiled pre-existing data structure without recompiling the second application.

13. The information storage medium of claim 12, wherein the assigning comprises:
   appending the new device type to the end of the list of device types, wherein each device type on the list is assigned a sequential index value according to its position on the list.

14. The information storage medium of claim 12, further comprising:
   creating a header file declaring the pre-existing data structure with the new device type.

15. The information storage medium of claim 12, wherein compiling the pre-existing data structure further comprises:
   preserving a second reference associated with a second sequential index value and a second device type previously added to the pre-existing data structure, wherein the compiled pre-existing data structure enables a previously compiled application to access the second device type via the second sequential index value without recompiling the application.

* * * * *